US008610896B2

(12) United States Patent
Spross et al.

(10) Patent No.: US 8,610,896 B2
(45) Date of Patent: Dec. 17, 2013

(54) APPARATUS AND METHOD FOR DETECTING PRESSURE SIGNALS

(71) Applicant: Halliburton Energy Services, Inc, Houston, TX (US)

(72) Inventors: Ronald L. Spross, Humble, TX (US); Paul F. Rodney, Spring, TX (US); Neal G. Skinner, Lewisville, TX (US); James H. Dudley, Spring, TX (US); John L. Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/744,380

(22) Filed: Jan. 17, 2013

(65) Prior Publication Data
US 2013/0128276 A1    May 23, 2013

Related U.S. Application Data

(63) Continuation of application No. 12/812,779, filed as application No. PCT/US2008/057344 on Mar. 18, 2008, now abandoned.

(60) Provisional application No. 61/021,669, filed on Jan. 17, 2008.

(51) Int. Cl.
*G01B 9/02* (2006.01)
*G01L 1/24* (2006.01)

(52) U.S. Cl.
USPC .......................................... 356/483; 356/35.5

(58) Field of Classification Search
USPC ................. 356/35.5, 241.1, 483; 250/227.19, 250/227.27; 73/152.22
See application file for complete search history.

(56) References Cited

U.S. PATENT DOCUMENTS

| 3,450,037 | A | | 6/1969 | McGuinn et al. |
| 4,633,079 | A | | 12/1986 | Rieger |
| 4,787,741 | A | | 11/1988 | Udd et al. |
| 5,155,548 | A | | 10/1992 | Danver |
| 5,218,197 | A | | 6/1993 | Carroll |
| 5,587,791 | A | * | 12/1996 | Belleville et al. ............. 356/483 |
| 5,649,035 | A | | 7/1997 | Zimmerman et al. |

(Continued)

FOREIGN PATENT DOCUMENTS

WO    WO 2005083369 A1 *  9/2005

OTHER PUBLICATIONS de Carvalho, R. T. et al. "Slow-flow measurements and fluid dynamics analysis using the Fresnel drag effect". Applied Optics, vol. 33, No. 25, Sep. 1, 1994, pp. 6073-6077.*

(Continued)

*Primary Examiner* — Michael A Lyons
(74) *Attorney, Agent, or Firm* — W Schmidt

(57) ABSTRACT

An apparatus for detecting data in a fluid pressure signal in a conduit comprises an optical fiber loop comprises a measurement section and a delay section wherein the measurement section is disposed substantially circumferentially around at least a portion of the conduit, and wherein the measurement section changes length in response to the fluid pressure signal in the conduit. A light source injects a first optical signal in a first direction into the measurement section and a second optical signal in a second direction opposite the first direction into the delay section. An optical detector senses an interference phase shift between the first optical signal and the second optical signal and outputs a first signal related thereto.

25 Claims, 5 Drawing Sheets

(56) References Cited

U.S. PATENT DOCUMENTS

| | | | |
|---|---|---|---|
| 6,097,486 | A | 8/2000 | Vakoc et al. |
| 6,459,486 | B1 | 10/2002 | Udd et al. |
| 6,501,067 | B2 | 12/2002 | Jones et al. |
| 6,529,444 | B2 | 3/2003 | Vakoc |
| 6,535,684 | B1 | 3/2003 | Kondo et al. |
| 6,618,153 | B2 * | 9/2003 | Lin et al. .................. 356/483 |
| 6,667,935 | B2 | 12/2003 | Vakoc |
| 6,909,667 | B2 * | 6/2005 | Shah et al. .................. 367/83 |
| 6,959,604 | B2 | 11/2005 | Bryant et al. |
| 7,028,543 | B2 | 4/2006 | Hardage et al. |
| 7,466,399 | B2 * | 12/2008 | Melnyk .................. 356/28.5 |
| 2001/0032924 | A1 | 10/2001 | Pramila et al. |
| 2002/0064331 | A1 * | 5/2002 | Davis et al. .................. 385/12 |
| 2006/0001863 | A1 | 1/2006 | Kishida et al. |
| 2006/0203614 | A1 | 9/2006 | Harmon |
| 2007/0142718 | A1 | 6/2007 | Abreu |
| 2007/0289741 | A1 | 12/2007 | Rambow |
| 2007/0295101 | A1 | 12/2007 | Johansen |

OTHER PUBLICATIONS

Bock, Highly Sensitive Fiber-Optic Sensor for Dynamic Pressure Measurement, IEEE Transactions on Instrumentation and Measurement, vol. 50, No. 5, Oct. 2001, p. 1085-1088.

Szustakowski and Palka, Contrast sensitive fiber optic Michelson interferometer as elongation sensor, Opto-Electronics Review, vol. 13, No. 1, 2005, p. 19-26.

Bing Qi et al., Fiber Optic Pressure and Temperature Sensors for Oil and Down Hole Application, Proc. SPIE, vol. 4578, 2002, p. 182-191.

* cited by examiner

APPARATUS AND METHOD FOR DETECTING PRESSURE SIGNALS

BACKGROUND OF THE INVENTION

The present disclosure relates generally to the field of telemetry systems for transmitting information through a flowing fluid. More particularly, the disclosure relates to the field of signal detection in such a system.

Sensors may be positioned at the lower end of a well drilling, string which, while drilling is in progress, continuously or intermittently monitor predetermined drilling parameters and formation data and transmit the information to a surface detector by some form of telemetry. Such techniques are termed "measurement while drilling" or MWD.

MWD may result in a major savings in drilling time and improve the quality of the well compared, for example, to conventional logging techniques. The MWD system may employ a system of telemetry in which the data acquired by the sensors is transmitted to receiver located on the surface. Fluid signal telemetry is one of the most widely used telemetry systems for MWD applications.

Fluid signal telemetry creates pressure signals in the drilling fluid that is circulated under pressure through the drill string during drilling operations. The information that is acquired by the downhole sensors is transmitted by suitably timing the formation of pressure signals in the fluid stream. The pressure signals are commonly detected by a pressure transducer tapped into a high pressure flow line at the surface. Access to, and penetration of the high pressure flow line may be restricted due to operational and/or safety issues.

BRIEF DESCRIPTION OF THE DRAWINGS

A better understanding of the present invention can be obtained when the following detailed description of example embodiments are considered in conjunction with the following drawings, in which.

Figure 1:
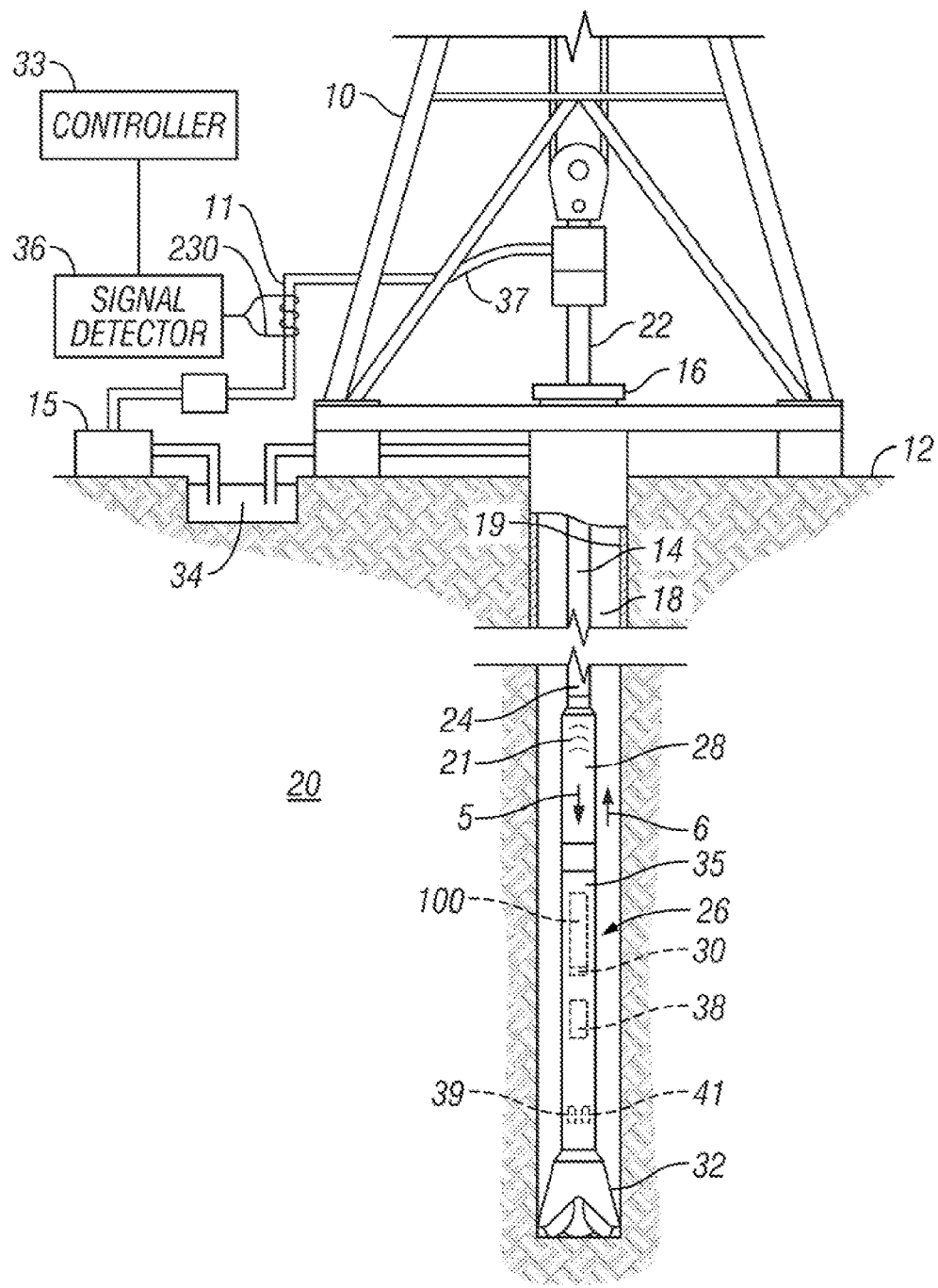
FIG. 1 shows schematic example of a drilling system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION

Referring to FIG. 1, a typical drilling installation is illustrated which includes a drilling derrick 10, constructed at the surface 12 of the well, supporting a drill string 14. The drill string 14 extends through a rotary table 16 and into a borehole 18 that is being drilled through earth formations 20. The drill string 14 may include a kelly 22 at its upper end, drill pipe 24 coupled to the kelly 22, and a bottom hole assembly 26 (BHA) coupled to the lower end of the drill pipe 24. The BHA 26 may include drill collars 28, an MWD tool 30, and a drill bit 32 for penetrating through earth formations to create the borehole 18. In operation, the kelly 22, the drill pipe 24 and the BHA 26 may be rotated by the rotary table 16. Alternatively, or in addition to the rotation of the drill pipe 24 by the rotary table 16, the BHA 26 may also be rotated, as will be understood by one skilled in the art, by a downhole motor (not shown). The drill collars add weight to the drill bit 32 and stiffen the BHA 26, thereby enabling the BHA 26 to transmit weight to the drill bit 32 without buckling. The weight applied through the drill collars to the bit 32 permits the drill bit to crush the underground formations.

As shown in FIG. 1, BHA 26 may include an MWD tool 30, which may be part of the drill collar section 28. As the drill bit 32 operates, drilling fluid (commonly referred to as "drilling mud") may be pumped from a mud pit 34 at the surface by pump 15 through standpipe 11 and kelly hose 37, through drill string 14, indicated by arrow 5, to the drill bit 32. The drilling mud is discharged from the drill bit 32 and functions to cool and lubricate the drill bit, and to carry away earth cuttings made by the bit. After flowing through the drill bit 32, the drilling fluid flows back to the surface through the annular area between the drill string 14 and the borehole wall 19, indicated by arrow 6, where it is collected and returned to the mud pit 34 for filtering. The circulating column of drilling mud flowing through the drill string may also function as a medium for transmitting pressure signals 21 carrying information from the MWD tool 30 to the surface. In one embodiment, a downhole data signaling unit 35 is provided as part of MWD tool 30. Data signaling unit 35 may include a pressure signal transmitter 100 for generating the pressure signals transmitted to the surface.

MWD tool 30 may include sensors 39 and 41, which may be coupled to appropriate data encoding circuitry, such as an encoder 38, which sequentially produces encoded digital data electrical signals representative of the measurements obtained by sensors 39 and 41. While two sensors are shown, one skilled in the art will understand that a smaller or larger number of sensors may be used without departing from the principles of the present invention. The sensors 39 and 41 may be selected to measure downhole parameters including, but not limited to, environmental parameters, directional drilling parameters, and formation evaluation parameters. Such parameters may comprise downhole pressure, downhole temperature, the resistivity or conductivity of the drilling mud and earth formations, the density and porosity of the earth formations, as well as the orientation of the wellbore.

The MWD tool 30 may be located proximate to the bit 32. Data representing sensor measurements of the parameters discussed may be generated and stored in the MWD tool 30. Some or all of the data may be transmitted in the form of pressure signals by data signaling unit 35, through the drilling fluid in drill string 14. A pressure signal travelling in the column of drilling fluid may be detected at the surface by a signal detector unit 36 employing optical fiber loop 230. The detected signal may be decoded in controller 33. The pressure signals may be encoded binary representations of measurement data indicative of the downhole drilling parameters and formation characteristics measured by sensors 39 and 41. Controller 33 may be located proximate the rig floor. Alternatively, controller 33 may be located away from the rig floor. In one embodiment, controller 33 may be incorporated as part of a logging unit.

Figure 2:
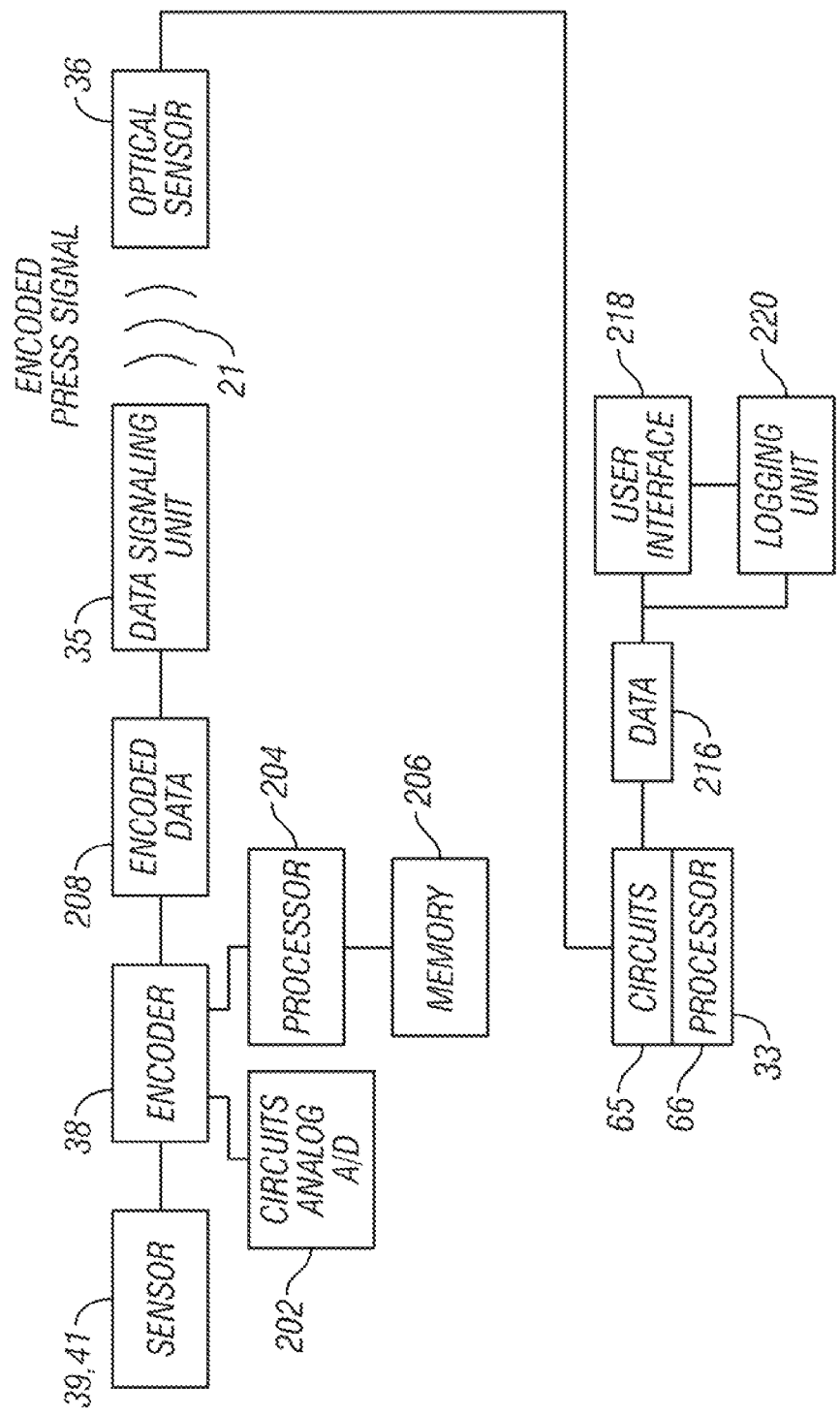
FIG. 2 shows an example block diagram of the acquisition of downhole data and the telemetry of such data to the surface in an example drilling operation.

FIG. 2 shows a block diagram of the acquisition of downhole data and the telemetry of such data to the surface in an example drilling operation. Sensors 39 and 41 acquire measurements related to the surrounding formation and/or downhole conditions and transmit them to encoder 38. Encoder 38 may have circuits 202 comprising analog circuits and analog to digital converters (A/D). Encoder 38 may also comprise a processor 204 in data communication with a memory 206. Processor 204 acts according to programmed instructions to encode the data into digital signals according to a pre-programmed encoding technique. One skilled in the an will appreciate that there are a number of encoding schemes that may be used for downhole telemetry. The chosen telemetry technique may depend upon the type of pressure signal transmitter 100 used. Encoder 38 outputs encoded data 208 to data signaling unit 35. Data signaling unit 35 generates encoded pressure signals 21 that propagate through the drilling fluid in drill string 14 to the surface. Pressure signals 21 are detected at the surface by signal detector 36 and are transmitted to controller 33 for decoding. In one example embodiment, signal detector 36 may be a fiber optic signal detector, described below. Controller 33 may comprise interface circuitry 65 and a processor 66 for decoding pressure signals 21 into data 216. Data 216 may be output to a user interface 218 and/or an information handling system such as logging unit 220. Alternatively, in one embodiment, the controller circuitry and processor may be an integral part of the logging unit 220.

Figure 3A:
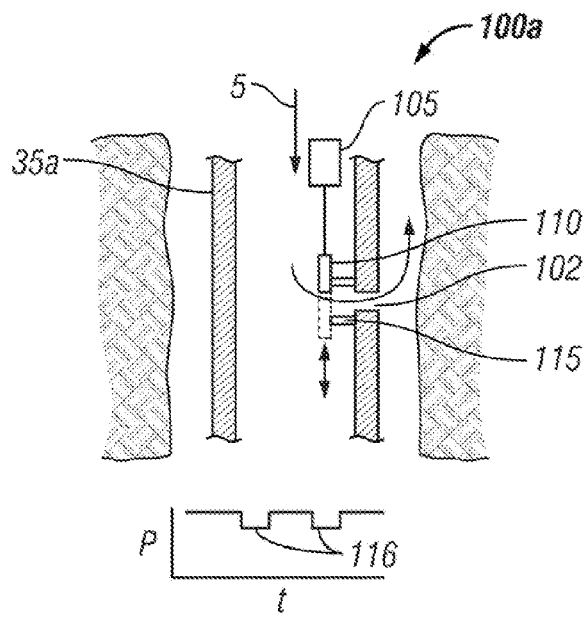
FIGS. 3A-3D show examples of pressure signal transmitter assemblies suitable for use in a fluid telemetry system.

FIGS. 3A-3D show example embodiments of pressure signal transmitter 100. FIG. 3A shows a pressure signal transmitter 100a disposed in data signaling unit 35a. Pressure signal transmitter 100a has drilling fluid 5 flowing therethrough and comprises an actuator 105 that moves a gate 110 back and forth against seat 115 allowing a portion of fluid 5 to intermittently pass through opening 102 thereby generating a negative pressure signal 116 that propagates to the surface through drilling fluid 5.

Figure 3B:
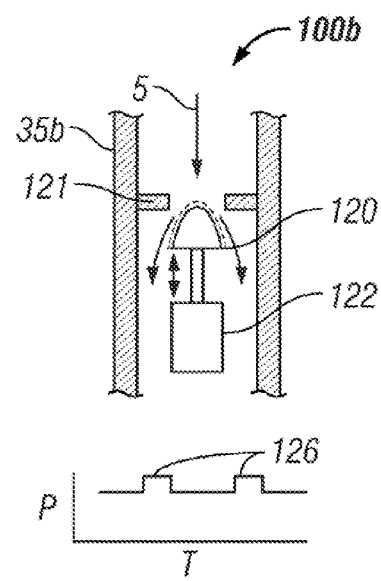

FIG. 3B shows a pressure signal transmitter 100b disposed in data signaling unit 35b. Pressure signal transmitter 100b has drilling fluid S flowing therethrough and comprises an actuator 122 that moves a poppet 120 back and forth toward orifice 121 partially obstructing the flow of drilling fluid 5 thereby generating a positive pressure signal 126 that propagates to the surface through drilling fluid 5.

Figure 3C:
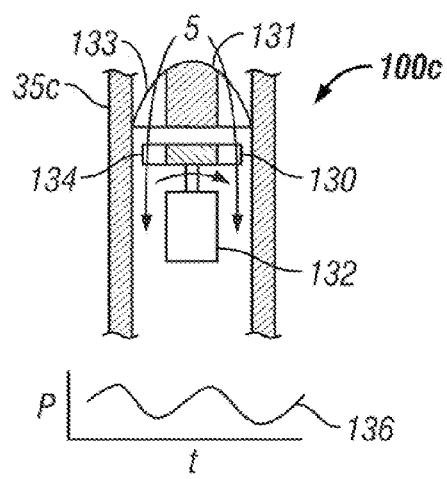

FIG. 3C shows a pressure signal transmitter 100c disposed in data signaling unit 35c. Pressure signal transmitter 100c has drilling fluid 5 flowing therethrough and comprises an actuator 132 that continuously rotates a rotor 130 in one direction relative to stator 131. Stator 131 has flow passages 133 allowing fluid 5 to pass therethrough. Rotor 130 has flow passages 134 and the movement of flow passages 134 past flow passages 133 of stator 131 generates a continuous wave pressure signal 136 that propagates to the surface through drilling fluid 5. Modulation of the continuous wave pressure signal may be used to encode data therein. Modulation schemes may comprise frequency modulation and phase shift modulation.

Figure 3D:
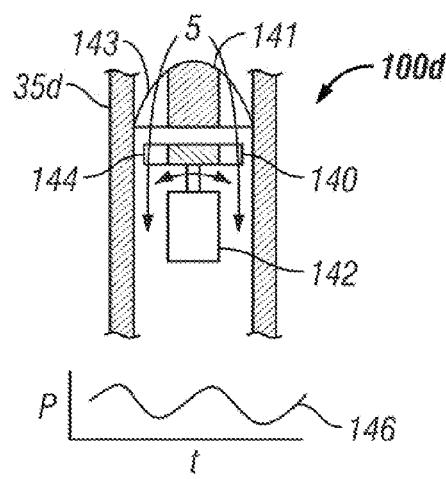

FIG. 3D shows a pressure signal transmitter 100d disposed in data signaling unit 35d. Pressure signal transmitter 100d has drilling fluid 5 flowing there through and comprises an actuator 142 that rotates a rotor 140 back and forth relative to stator 141. Stator 141 has flow passages 143 allowing fluid 5 to pass therethrough. Rotor 140 has flow passages 144 and the alternating movement of flow passages 144 past the flow passages 143 of stator 141 generates a continuous wave pressure signal 146 that propagates to the surface through drilling fluid 5. Modulation of the continuous wave pressure signal may be used to encode data therein. Modulation schemes may comprise frequency modulation and phase shift modulation.

Figure 4:
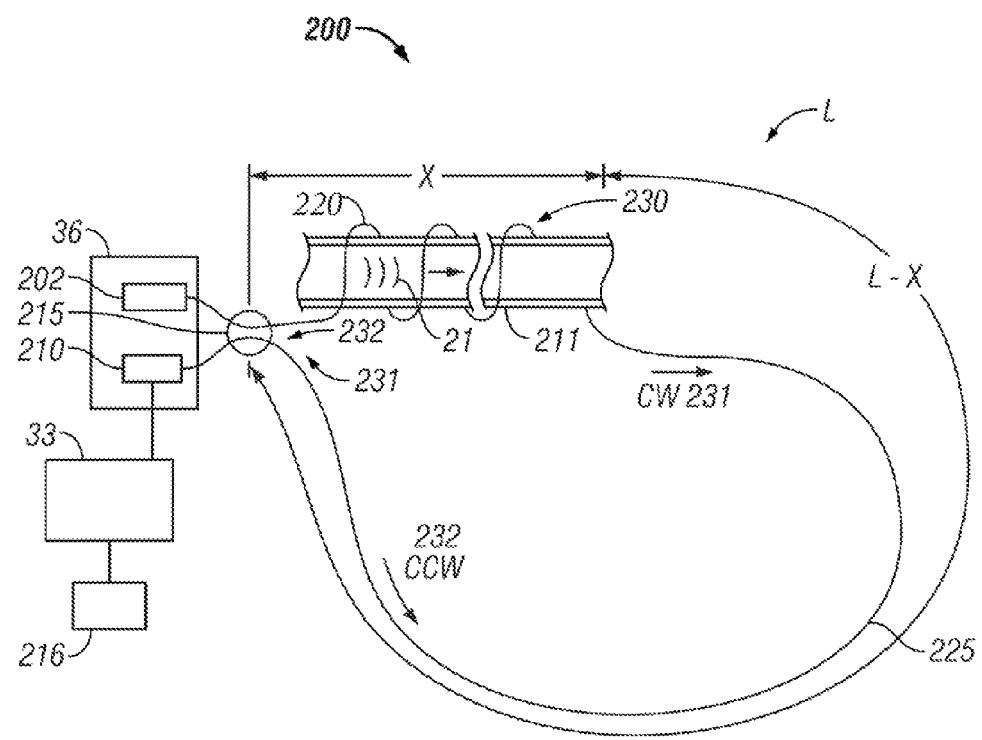
FIG. 4 shows an example embodiment of an optical interferometer system used to detect downhole transmitted pressure signals.

FIG. 4 shows an example of signal detector 36 configured as an optical interferometer 200 for detecting pressure signals in conduit 211. Interferometer 200 comprises a light source 202, an optical fiber loop 230, an optical coupler/splitter 215, and an optical detector 210 Light source 200 may be a laser diode, a laser, or a light emitting diode that emits light into optical coupler/splitter 215 where the light is split into two beams 231 and 232. Beam 231 travels clockwise (CW) through loop 230, and beam 232 travels counterclockwise (CCW) through loop 230.

Figure 5:
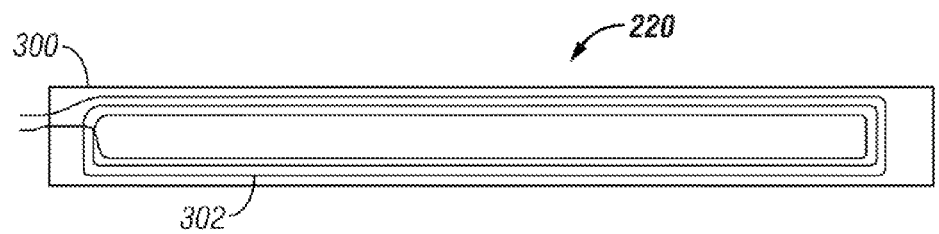
FIG. 5 shows an example of a measurement section fiber adhered to a pliant substrate.

Loop 230 has a length, L, and comprises measurement section 220 and delay section 225. In one embodiment, measurement section 220 may be 2-10 meters in length. In this example, measurement section 220 is wrapped at least partially around conduit 211, which may be standpipe 11 of FIG. 1. Alternatively, measurement section 220 may be wrapped around any section of flow conduit that has pressure signals travelling therein. The length of measurement section 220 is designated by X in FIG. 4, and represents the length of fiber that reacts to hoop strains in standpipe 11 caused by the pressure signals therein. The optical fibers of measurement section 220 may be physically adhered to conduit 211. Alternatively, see FIG. 5, measurement section 220 may comprise a length, X, of optical fiber 302 adhered in a folded pattern to a pliant substrate 300 that is attachable to a conduit. In one embodiment, pliant substrate 300 may be a biaxially-oriented polyethylene terephthalate material, for example a Mylar® material manufactured by E. I. Dupont de Nemours & Co. Pliant substrate 300 may be adhesively attached, for example, to standpipe 11 of FIG. 1 using any suitable adhesive, for example an epoxy material or a cyanoacrylate material.

Delay section 225 may be on the order of 500-3000 meters in length. The small diameter of optical fibers contemplated (on the order of 250 μm) allows such a length to be wound on a relatively small spool. As shown in FIG. 4, delay section 225 comprises a length identified as L−X. It will be seen that L is a factor in the sensitivity of the sensor.

Counter-propagating beams 231, 232 traverse loop 230 and recombine through coupler/splitter 215, and detected by photo-detector 210. Under uniform (constant in time) conditions, beams 231, 232 will recombine in phase at the detector 240 because they have both traveled equal distances around loop 230. Consider counter-propagating beams 231, 232 and a time varying pressure P(t) in standpipe 11. Beams 231, 232 will be in phase after they have traveled the distance X in their two paths, and they will be in phase after they have continued through the distance L−X as well. Now, let the pressure within the pipe be changing at a rate of dP/dt during the time Δt while beams 231, 232 travel the distance L−X, then $$\Delta t = (L-X)n/c,$$

where c is the speed of light, and n is the refractive index of the optical fiber. During this time interval, the pressure within the pipe changes by an amount ΔP, which acts to radially expand standpipe 11. This expansion results in a change ΔX in the length. X, of the measurement section 220 of optical fiber 230 wrapped around conduit 211. Although at the end of the interval Δt the two beams are in phase, they will go out of phase for the last portion of the circuit before they recombine, because the length of measurement section 220 has changed during the previous interval Δt. For the final leg of the trip around the loop, the counter-clockwise beam 232 will travel a distance that is different by an amount ΔX from the clockwise rotating beam 231. When the beams combine at detector 210, they will be out of phase by a phase difference, Δφ, where $$\Delta\phi=2\pi(\Delta X)/n\lambda,$$

where λ is the wavelength of the light emitted by source 202. As beams 231, 232 are combined, it can be shown that a factor in the signal will be cos(Δφ2). Thus, counter propagating beams 231, 232 will be out of phase when ΔX λ.

The change of the pressure in the pipe during the interval Δt is given by $$\Delta P=(dP/dt)\Delta t=(dP/dt)(L-X)(n/c).$$

Let K be the sensitivity of the pipe to internal pressure; that is, the change in circumference of the pipe ΔC due to a change in pressure ΔP given by, $$\Delta C=K(\Delta P)$$

K can be computed from dimensions and material properties of the pipe materials. For example, for a thin-wailed pipe, where $D_{pipe}>10*$ pipe thickness, t, it can be shown that $$K=\pi D^2_{pipe}/2Et$$

where E is the modulus of elasticity of the pipe material. For a thick walled pipe, where $D_{pipe}\leq 10*$ pipe thickness, t, it can be shown that $$K=2\pi D_o D_i^2/E(D_o^2-D_i^2)$$

where $D_o$ and $D_i$ are the outer and inner pipe diameters, respectively. if $N_{coil}$ is the number of turns of fiber around the pipe, then $$\Delta X=N(\Delta C)=N_{coil}K(dP/dt)(L-X)(n/c).$$

Thus, the change in length indicated by the interferometer is a function of the time derivative of the pressure signal, the number of turns $N_{coil}$ of fiber on the pipe, and the length L of the delay portion of the fiber.

Figure 6:
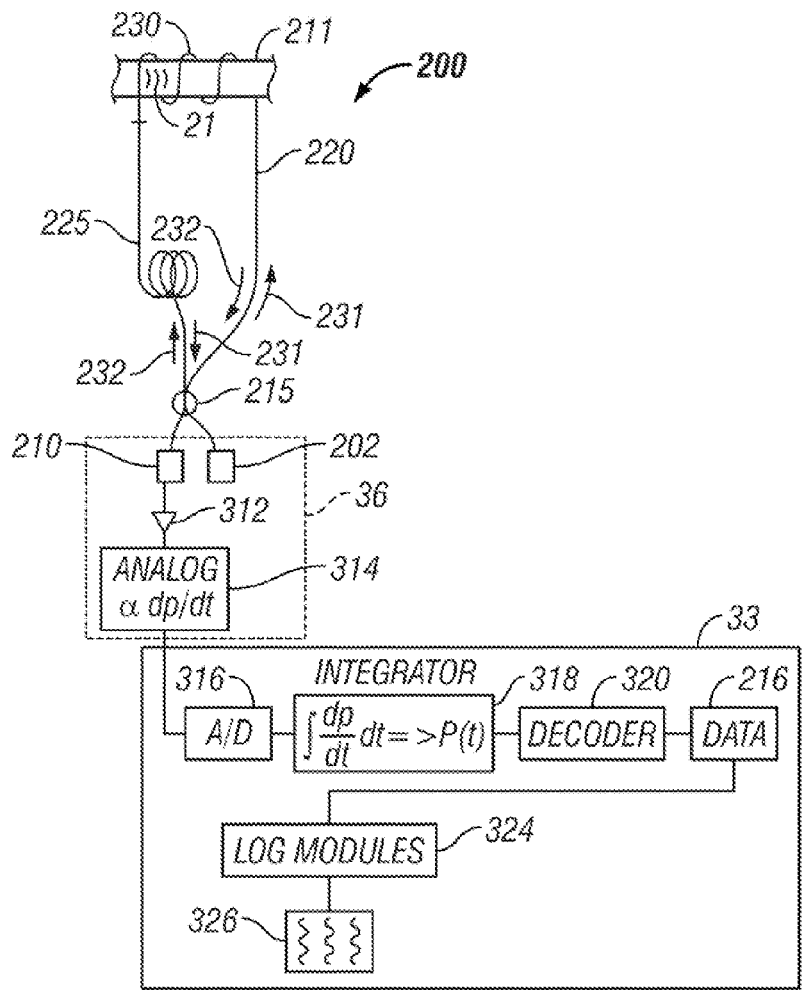
FIG. 6 is a block diagram showing an example of the processing of a received optical signal.

FIG. 6 is a block diagram showing an example of the processing of a received optical signal using interferometer 200. Counter propagating beams 231, 232 travel through optical fiber 230 comprising measurement section 220 and delay section 225. In this example, delay section 225 comprises multiple loops of optical fiber around a spool. Pressure signal 21 causes a lengthening of measurement section 220 which produces a phase shift in the recombined beams at detector 210, as described previously. Detector 210 outputs a phase shift signal that is conditioned by signal conditioner 312 and outputs as an analog signal proportional to the time derivative of pressure dp/dt at 314. The signal 314 is transmitted to A/D in block 316 where the dp/dt signal is digitized. The digitized dp/dt signal is integrated in block 318 to produce a digital signal similar to the original pressure signal P(t). The P(t) signal is then decoded in block 320 to produce data 216. Data 216 may be used in log modules 324 to produce logs 326. In one embodiment, optical source 202, optical detector 210, and signal conditioner 312 may be physically located close to conduit 211 in signal detector 36. Alternatively, some of these items may be located away from conduit 211, for example in controller 33. The functional modules 316, 318, 320, 324, and 326 may comprise hardware and software and may be located in controller 33. In one embodiment, controller 33 may be a stand alone unit located in a separate location, for example a logging unit. Alternatively, controller 33 may be an integral part of a logging, unit using shared hardware and software resources. While described above with reference to a single optical signal detector on a conduit, it is intended that the present disclosure cover any number of such detectors space out along such a conduit.

Figure 7:
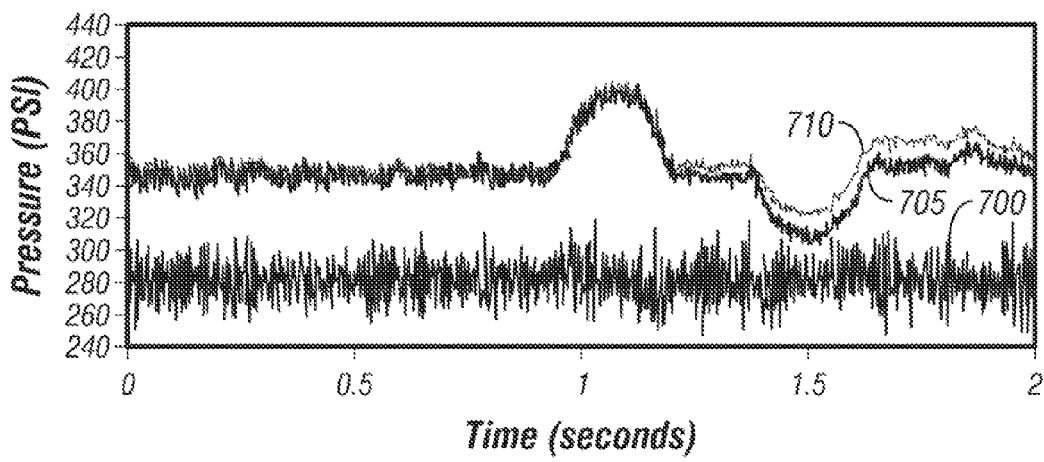
FIG. 7 is a chart of laboratory test data showing raw interferometer data and integrated interferometer data compared to conventional pressure sensor data for pressure signal detection.

FIG. 7 is a chart of laboratory test data showing, raw interferometer data and integrated interferometer data compared to conventional pressure sensor data for pressure signal detection. Pressure signals are generated in a flowing fluid in a flow loop. A pressure signal transmitter generates pressure signals into the flowing fluid. An interferometer similar to interferometer 200 is installed on a section of conduit. A conventional strain gauge pressure sensor is mounted within 2 m of the interferometer. FIG. 7 shows the raw interferometer data proportional to dp/dt in curve 700. The raw data is processed as described above to produce an integrated interferometer curve 710. Curve 705 is the reading from the conventional pressure transducer. As shown in FIG. 7, integrated interferometer curve 710 is substantially similar to conventional pressure transducer curve 705.

Numerous variations and modifications will become apparent to those skilled in the art. It is intended that the following claims be interpreted to embrace all such variations and modifications.

What is claimed is:

1. An apparatus for detecting data in a fluid pressure signal in a conduit comprising:
    an optical fiber loop comprising a measurement section and a delay section wherein the measurement section is disposed substantially circumferentially around at least a portion of the conduit and wherein the measurement section changes length in response to the fluid pressure signal in the conduit;
    a light source injecting a first optical signal in a first direction into the measurement section and a second optical signal in a second direction opposite the first direction into the delay section; and
    an optical detector to sense an interference phase shift between the first optical signal and the second optical signal and outputting a first signal related thereto.

2. The apparatus of claim 1 wherein the first signal is related to a time derivative of the fluid pressure signal in the conduit.

3. The apparatus of claim 1 wherein the measurement section and the delay section are sequentially disposed.

4. The apparatus of claim 1 further comprising a controller in data communication with the optical detector wherein the controller integrates the first signal with respect to time and generates an output signal substantially similar to the fluid pressure signal.

5. The apparatus of claim 4 wherein the controller decodes the output signal into the data transmitted in the fluid pressure signal.

6. The apparatus of claim 1 wherein the light source is chosen from the group consisting of a laser, a laser diode, and a light emitting diode.

7. The apparatus of claim 1 further comprising a pliant substrate having the optical fiber of the measurement section attached thereto.

8. The apparatus of claim 7 wherein the pliant substrate is attachable around at least a portion of the conduit.

9. The apparatus of claim 1 wherein the delay section is about 500 meters to about 3000 meters long.

10. The apparatus of claim 1 wherein the measurement section is about 2 meters to about 10 meters long.

11. A method for detecting data in a fluid pressure signal in a conduit comprising:
    providing an optical fiber loop comprising a measurement section and a delay section;
    disposing the measurement section substantially circumferentially around at least a portion of the conduit wherein the measurement section changes length responsive to the fluid pressure signal in the conduit;

injecting a first optical signal in a first direction into the measurement section and a second optical signal in a second direction opposite the first direction into the delay section; and sensing an interference phase shift between the first optical signal and the second optical signal and outputting a first signal related thereto.

12. The method of claim 11 wherein the first signal is indicative of a time derivative of the fluid pressure signal in the conduit.

13. The method of claim 12 further comprising integrating the first signal with respect to time and generating an output signal substantially similar to the fluid pressure signal in the conduit.

14. The method of claim 13 further comprising decoding the output signal into data transmitted in the fluid pressure signal.

15. The method of claim 11 further comprising attaching the measurement section optical fiber to a pliant substrate.

16. The method of claim 15 further comprising attaching the pliant substrate at least partially around the conduit.

17. An apparatus for detecting a fluid pressure pulse signal propagating in a conduit comprising:

an optical fiber loop comprising a measurement section and a sequentially disposed optical delay section wherein the measurement section is disposed substantially circumferentially around at least a portion of the conduit and changes in length in response to the pressure pulse in the conduit;

a light source injecting a first optical signal in a first direction into the measurement section and a second optical signal in a second direction opposite the first direction into the delay section;

an optical detector to sense an interference phase shift between the first optical signal and the second optical signal to indicate a time derivative of the pressure pulse in the conduit and generating a first signal indicative thereof; and a controller in data communication with the optical detector, wherein the controller integrates the first signal with respect to time and generates an output signal substantially similar to the fluid pressure pulse signal.

18. The apparatus of claim 17 wherein the controller decodes the output signal into data transmitted in the fluid pressure pulse signal.

19. The apparatus of claim 17 wherein the optical fiber of the delay section is about 500 meters to about 3000 meters long.

20. The apparatus of claim 17 wherein the optical fiber of the measurement section is about 2 meters to about 10 meters long.

21. A fluid telemetry system comprising:

a transmitter located at a downhole location transmitting data as an encoded pressure signal through a fluid flowing in a conduit;

an optical sensing system detecting the encoded pressure signal proximate a surface location wherein the optical sensing, system comprises:

an optical fiber loop comprising a measurement section and a sequentially disposed optical delay section wherein the measurement section is disposed substantially circumferentially around at least a portion of the conduit and changes in length in response to the encoded pressure signal in the conduit;

a light source injecting a first optical signal in a first direction into the measurement section and a second optical signal in a second direction opposite the first direction into the delay section;

an optical detector sensing an interference phase shift between the first optical signal and the second optical signal indicative of a time derivative of the encoded pressure signal in the conduit and generating a first signal indicative thereof; and a controller in data communication with the optical detector wherein the controller integrates the first signal with respect to time and generates an output signal substantially similar to the encoded pressure signal.

22. The fluid telemetry system of claim 21 wherein the controller decodes the output signal into the data.

23. The fluid telemetry system of claim 21 further comprising a pliant substrate having the optical fiber of the measurement section attached thereto wherein the pliant substrate is attachable around at least a portion of the conduit.

24. The fluid telemetry system of claim 21 wherein the optical fiber of the delay section is about 500 meters to about 3000 meters long.

25. The fluid telemetry system of claim 21 wherein the optical fiber of the measurement section is about 2 meters to about 10 meters long.

* * * * *